Figure 1:
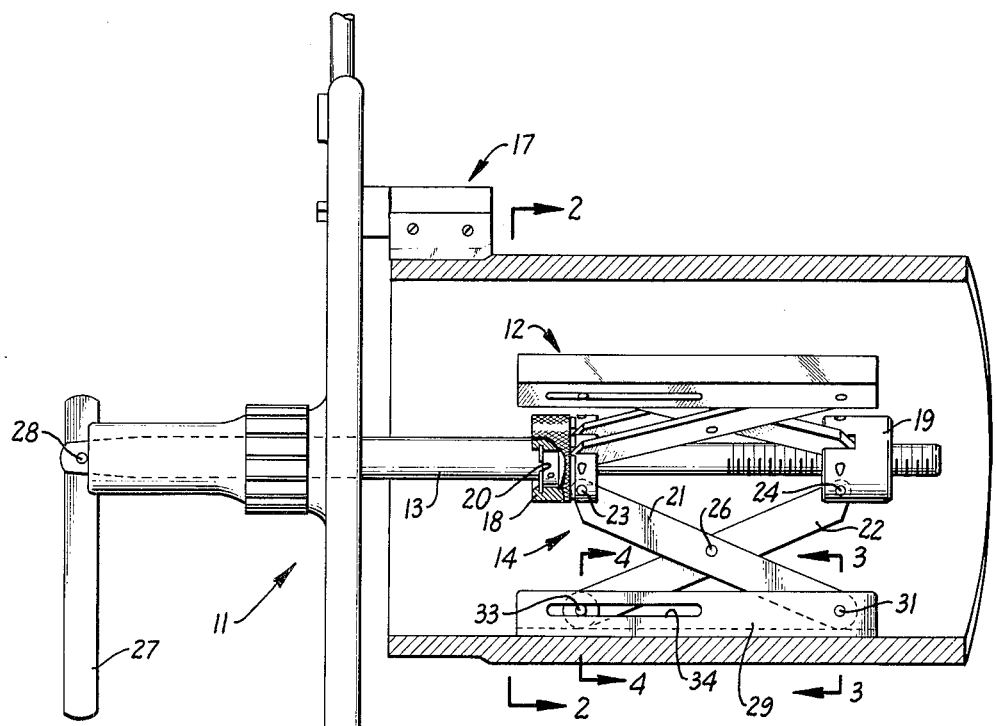

Dec. 14, 1965  J. B. GILL  3,222,960
ARBOR CONSTRUCTION FOR PIPE TOOLS

Filed Nov. 19, 1963  3 Sheets-Sheet 1

INVENTOR.
JOHN B. GILL
BY Schapps & Hatch
ATTORNEYS

INVENTOR.
JOHN B. GILL
BY
Schapp & Hatch
ATTORNEYS

United States Patent Office 3,222,960
Patented Dec. 14, 1965

3,222,960
ARBOR CONSTRUCTION FOR PIPE TOOLS
John B. Gill, 20433 Earl St., Torrance, Calif.
Filed Nov. 19, 1963, Ser. No. 324,765
10 Claims. (Cl. 82—4)

The present invention relates to improvements in an arbor construction for pipe tools and more particularly to a mechanism capable of supporting rotating devices such as pipe cutters and pipe machining tools.

In order to provide the firm support necessary to achieve accurate machining, cutting or like operations on pipes, it is necessary to provide a rigid holding mechanism that maintains the tool in proper position on the pipe during machining and cutting operations. Certain pipe tools have been developed in which the tools are mounted on an arbor and the arbor is centered within the pipe so that the tool may be rotated around the arbor shaft and thereby be accurately positioned with respect to the pipe. In such a situation it is found that slight changes from perfectly circular cross sections in the pipe are averaged out so as to be minimal in their influence.

A typical example of such a support structure is found in United States Patent 2,607,376 to John T. Montgomery entitled "Pipe Machining Tool." This mechanism utilizes three groups of radially expandable fingers symmetrically disposed inside the pipe. Another example of a typical structure is shown in my co-pending application Serial No. 827,043, filed July 14, 1959, and entitled "Adjustable Pipe Machining Tool."

While the holding means in the references cited above are eminently successful for the purpose, it has been found that certain problems require an improved structure for specific types and sizes of pipe. For example, certain asbestos-cement pipes have epoxy linings on the inner surface thereof, and these linings are rather sensitive to extreme pressure. The ends of the fingers which support the arbor, as shown in the Montgomery patent, tend to penetrate through such lining and cause injury thereto. A similar problem is encountered to some extent with thin walled pipes. In addition, problems have been encountered with extra large pipes where it becomes necessary to provide extremely heavy finger structures to prevent flexural bending thereof and to absorb vibrations, because of the increased length of the fingers.

Accordingly, it is a principal object of the present invention to provide an improved arbor holding mechanism in which the above-mentioned problems are substantially eliminated.

Another object of the invention is to provide means in combination with expandable fingers for providing a smooth skidding surface whereby the arbor holding mechanism may be more easily positioned inside a pipe or like structure, particularly in the larger sizes of asbestos-cement pipe and where the arbor is relatively heavy in order to accommodate large and heavy pipe tools.

A further object of the invention is to provide means for holding an arbor in aligned position within a pipe in such manner as to provide a distribution of pressure calculated to avoid a concentration of heavy forces at any one point on the pipe wall.

A still further object of the invention is to provide an arbor construction of the character described in which relatively short expandable fingers are utilized to hold an arbor or the like within a pipe and means is provided to extend the capacity of the relatively short fingers so as to provide adjustability to a wide range of pipe sizes and a greater stabilizing effect of the tool.

Still another object of the invention is to provide a holding mechanism of the character described which is especially adapted for use in extra large pipes yet which is adjustable for use over a rather large range of pipe sizes and is formed for easy maneuvering into proper position in the pipe.

Further objects and advantages of the invention will be apparent as the specification progresses, and the new and useful features of the arbor construction for pipe tools will be fully defined in the claims attached hereto.

These and other objects are accomplished by providing the expandable arbor with special elongated members, called channel bars, which are adapted to be interposed between the fingers and the pipe wall. The channel bars are especially constructed to provide easy operation of the expanding fingers throughout the adjusting and tightening operation. For this purpose, a sliding connection is provided between the fingers and the channel bars so that the ends of the fingers do not slide on the surface of the pipe as the expansion is being accomplished.

The channel bar construction permits the use of shorter fingers for similar pipe sizes, the channel bars being designed in various sizes and shapes depending upon the type of pipe and size ranges involved.

Figure 3:
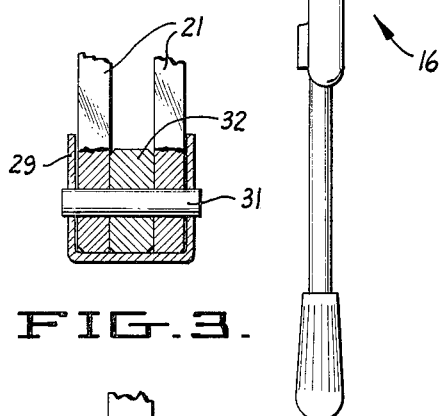
Figure 2:
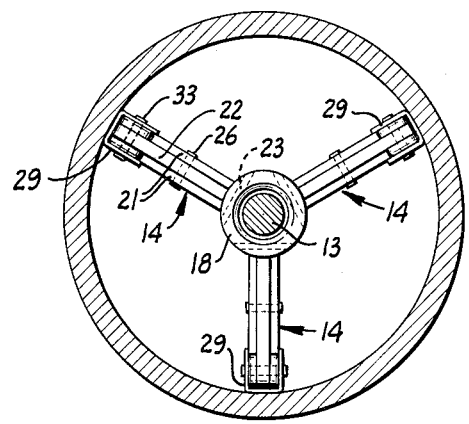
Figure 4:
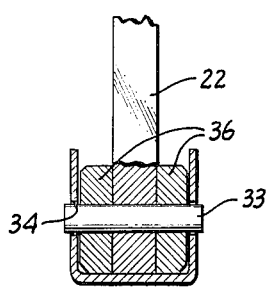
Figure 5:
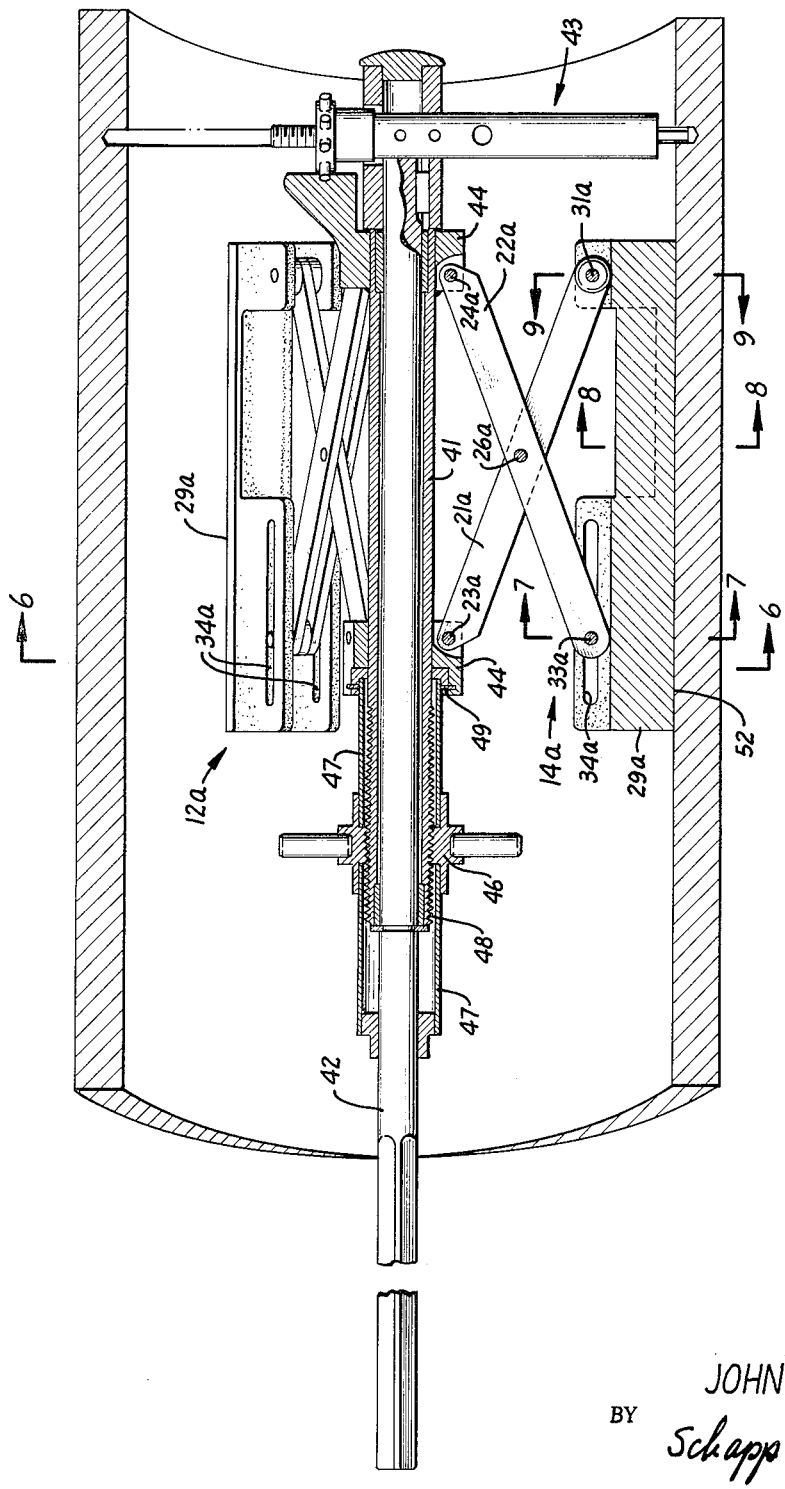
Figure 6:
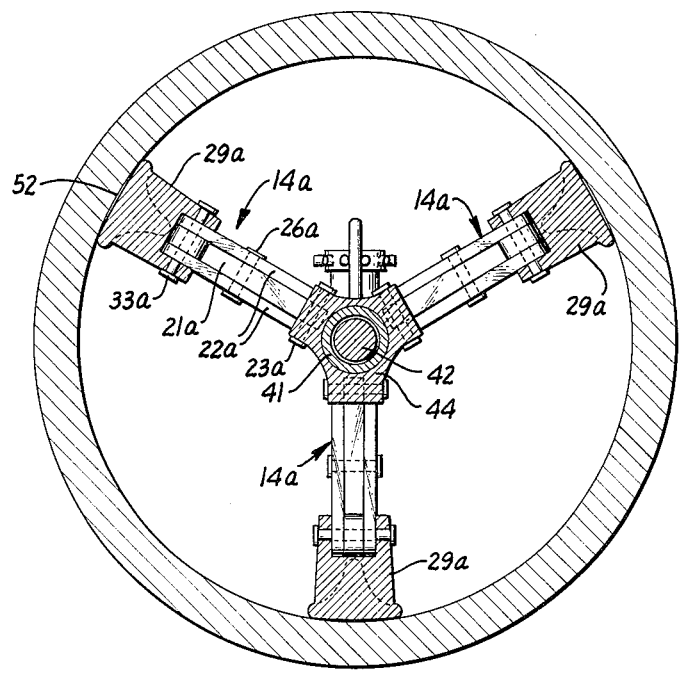
Figures 7, 8:
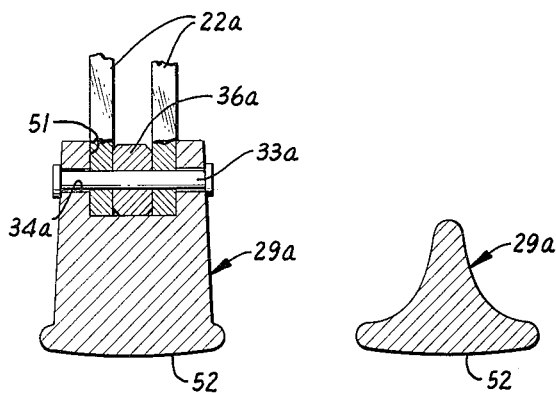
Figure 9:
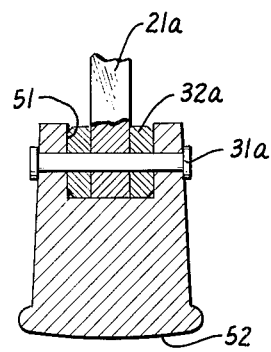

The preferred forms of the invention are illustrated in the accompanying drawings, forming a part of this description, in which:

FIGURE 1 is a side view of a typical pipe machining tool mounted on a tool holding mechanism constructed in accordance with the present invention and shown operatively positioned in a pipe end;

FIGURE 2, a cross-sectional view of the tool shown in FIGURE 1 taken substantially on the plane of line 2—2 thereof;

FIGURE 3, a cross-sectional view of a portion of the tool shown in FIGURE 1, taken substantially on the plane of line 3—3 thereof;

FIGURE 4, another cross-section view of a portion of the tool shown in FIGURE 1 taken substantially on the plane of line 4—4 thereof;

FIGURE 5, a side view of an internal pipe cutting tool mounted on another form of the tool holding mechanism of the present invention;

FIGURE 6, a cross-sectional view of the tool shown in FIGURE 5 taken substantially on the plane of line 6—6 thereof;

FIGURE 7, an enlarged fragmentary cross-sectional view of a portion of the tool taken substantially on the plane of line 7—7 of FIGURE 5;

FIGURE 8, a cross-sectional view of another portion of the tool of FIGURE 5 taken substantially on the plane of line 8—8 thereof; and FIGURE 9, a cross-sectional view of another portion of the tool shown in FIGURE 5 taken substantially on the plane of line 9—9 thereof.

While only the preferred forms of the invention are shown, it should be understood that various changes or modifications may be made within the scope of the claims attached hereto without departing from the spirit of the invention.

Referring more particularly to the drawings and especially to FIGURES 1 through 4, there is shown a pipe machining tool 11 rotatably mounted on a pipe tool holding mechanism 12 constructed according to the invention. The mechanism 12 contains a shaft 13 held rigidly in a location centrally of the pipe by anchoring means 14 adapted to be placed inside the pipe and expanded radially against the inner surface thereof. This mechanism is basically the same as that shown in the Montgomery patent except that it contains the improved structure added thereto and is presented to illustrate how the present invention may be utilized to improve such prior structures. In other words, it will be appreciated that these prior devices may be remodeled to include the improved form of the invention or that the invention may be applied to newly designed machines.

Accordingly, FIGURE 1 shows a tool 11 mounted on the shaft 13, the tool including a cutter head 16 carrying a cutter 17 adapted to machine the end of an asbestos-cement pipe 15 to a desired configuration. Obviously, other tools which are adapted to be held by a shaft centrally positioned inside a pipe could be used on the present pipe tool holding mechanism, and the present invention is not intended to be limited to any particular tool.

As here shown, the anchoring means 14 includes a bearing 18 in which the shaft 13 revolves but is held against endwise movement as by a shoulder 20 formed on the shaft. A nut or second bearing 19 is threaded upon the inner end of the shaft, and cooperative fingers 21 and 22 pivoted to the bearing and nut as at 23 and 24 and to each other intermediate their length as at 26. Preferably, the fingers are provided in three radial sets or groups spaced 120° apart and each group usually comprises a middle finger 22 attached to the nut and two outer fingers 21 straddling the middle finger. However, the number of fingers in each group may vary so long as the expandable characteristic is provided, the three finger structure being preferred.

The outer end of shaft 13 is equipped with a crank 27 pivoted thereto as at 28, the crank serving to provide rotative force to the shaft 13 when tightening up the anchoring means 14. All of these structures are similar to those shown in the Montgomery patent cited above, and for a more complete description thereof, the patent is referred to as a reference.

In accordance with the present invention, the anchoring means 14 is improved by having an elongated pipe engaging member 29 on each of the groups of expandable fingers. Each of these elongated pipe engaging members transfer the pressure from the finger ends to the pipe wall and spread the pressure over a larger surface. This provides a strong grip with minimal injury to the pipe, and is suitable for lined pipe or the like which cannot withstand the pressures exerted by the finger ends when constructed according to the Montgomery patent.

These pipe engaging members should be constructed so as to fit against the inner surface of the pipe and not move when the tightening is effected and yet be capable of being mounted on the groups of fingers. In order to achieve this mounting, the pipe engaging members must be free to assume a changing angle with respect to the fingers, and this is preferably accomplished by providing an engagement between the fingers and the pipe engaging members which is pivotal in nature. In addition, the pipe engaging member must be attached to the finger ends in a manner permitting the fingers 21 and 22 to have their ends moved relatively closer together as they expand radially outward. Accordingly, it is preferred to have at least one of the finger ends such as the fingers 21 pivotally attached to the pipe engaging member 29 by means of a pin 31. As best seen in FIGURE 3, this may be effected by holding the finger ends 21 apart by means of a spacing washer 32, the whole unit being held in place by the pin 31 engaged in bores formed through the washer 32, fingers 21 and the side walls of a U-shaped or channel-shaped pipe engaging member 29.

With these fingers pivotally attached as shown, it is possible to simply allow the other finger 22 to bear against the inner wall of the channel at the other end and slide therealong as the fingers are expanded. However, in order to provide a more rigid construction and retain the shape of the unit, it is preferable to attach the ends of finger 22 to the other end of the channel bar by means of pin 33, which in turn fits through an elongated slot 34 in the U-shaped pipe engaging member as shown in the embodiment of FIGURES 1 through 4. Once again, the spacing washers 36 are provided to obtain a tightly fitting construction.

Preferably, the ends of fingers 21 and 22 are rounded and the bore for pin 31 and slot for pin 33 are sufficiently large to provide a relatively loose fit so that, when outward pressure is exerted, the finger ends will bear directly against member 29. This gives the fingers a much better bearing surface and eliminates the possibility of shearing the pins, elongating the holes and slots, or distorting the channel walls.

Thus in the embodiment shown in FIGURES 1 through 4, there is illustrated a manner of improving the pipe tool holding mechanism utilized in patents such as the Montgomery patent or other similar structures without substantially changing their capacity or the diameter of pipe in which they are designed to fit. This is accomplished by providing pipe engaging members which are substantially U-shaped so that only the thickness of the base wall adds to the radius of the pipe tool holding mechanism. With this construction, it is easy to convert existing tools to a form containing the improvement of the invention so as to obtain the advantages thereof.

The manner of using the invention will be readily understood from the foregoing description. When the pipe tool holding mechanism is to be put in place, the tool is usually located on the shaft 13 and the anchoring means oriented so that one set of fingers points vertically downward as shown in FIGURE 2. The tool is then slid into the end of the pipe utilizing the lower channel member as a skid. This allows for accurate and easy placement of the tool in position as well as providing the advantages described above. With the tool inserted in place, the shaft 13 is rotated until engagement with the pipe wall is made. Final adjustment of the approximate location of the cutter 17 is made, and the anchoring means 14 tightened by utilizing the crank 27 to rotate shaft 13. As the shaft is turned, the nut 19 is brought closer to the bearing 18 and the fingers are spread or expanded outward and these fingers in turn press the elongated pipe engaging members 29 against the pipe surfaces.

With the foregoing construction, it is seen that the pipe engaging members provide a smooth distribution of pressure and avoid damage which might otherwise occur from excessive pressure being exerted by the finger ends. It is also seen that with these smooth surfaced pipe engaging members, the unit is better able to seek the proper central location and position the shaft 13 on the exact or true axis of the pipe.

The use of the elongated pipe engaging members is particularly valuable as the pipe sizes operated upon increase and the size of the tool becomes larger, because the tools necessarily become heavier and are harder to handle. With the channel members in place, the tool is more easily handled by sliding as illustrated above.

It is also found, that as the pipe diameters get larger and the fingers become longer, the stress on each finger is apt to become unduly great unless the fingers are made excessively large. These strains can be reduced by utilizing shorter fingers and obtaining the longer radius for each group of fingers by utilizing elongated pipe holding members such as those shown in the embodiment of FIGURES 5 through 9. As there shown, the pipe engaging members may add as much as two inches to the radius and this will provide a four-inch increase in the diameter without increase in size of the fingers. Both types of pipe engaging members can be used interchangeably, if desired, and the use of both types provides an additonal four-inch range of effectiveness for the pipe anchoring means.

Both types of pipe engaging members have their advantages. Those made with castings extend the capacity of short fingers already built for small range of sizes. It is also believed that this type of structure adds a greater stabilizing effect to the tool, because the shorter fingers with heavier castings seem to vibrate less under certain conditions. It has been found that as the expandable fingers get longer, they also must be built heavier to absorb vibration, although lighter weight fingers can be extended to within practical limits without bending or flexing. The difference in vibration is quite noticeable between the heavier and lighter fingers when made of the same length. Also, under certain conditions the short and lighter weight fingers with the heavier cast pipe engaging members seem to set up less vibration than longer but heavier steel fingers with the light weight channel. Accordingly, it becomes a matter of selecting the best form to suit the job requirements.

In the embodiment of FIGURES 5 through 9, the modified type of pipe engaging members are shown in place on my improved internal pipe cutter described and claimed in my copending application Serial No. 300,029, filed August 5, 1963, and entitled "Internal Pipe Cutter." Again it will be appreciated that the present invention is not to be limited by the type of tool, but that a typical tool is shown for the sake of illustration.

Thus, there is shown in FIGURES 5 through 9 a pipe tool holding mechanism or arbor 12a mounted on a tubular sleeve 41 in much the same fashion that the anchoring means 14 is held on shaft 13 in the embodiment of FIGURE 1. The purpose of the tubular shaft 41 is to allow a drive shaft 42 to be journaled therein for rotation and provide rotation to the cutter head 43 mounted on the side opposite from the anchoring means as shown in FIGURE 5. The operation and description of this cutter head and the drive mechanism therefor is explained in detail in my co-pending application cited above, and the description is, therefore, not repeated here. However, the description of the anchoring means as well as the improved portion thereof which is claimed herein will be described in detail.

Referring again to FIGURE 5, it is seen that the tubular sleeve 41 which serves as a hub for shaft 42 has anchoring means 14a attached thereto in somewhat similar fashion to the form shown above. Thus, the anchoring means 14a comprises a pair of bearings 44 and 45 adapted to be moved axially toward and away from each other on the sleeve 41. These bearings have fingers 21a and 22a pivoted thereto at 23a and 24a and to each other intermediate their length at 26a. As in the form shown above, there are preferably three sets or groups of fingers and each group contains a pair of fingers serving as one unit and a single finger carried therebetween for a symmetric and strong construction.

The fingers are expanded radially to provide a strong gripping means inside the pipe for the arbor while at the same time automatically centering the same by moving the bearings 44 relatively toward one another. This movement is accomplished by squeezing the bearings together through rotation of nut 46 according to a special construction described and claimed in my copending application. Briefly speaking, the rotation of nut 46 provides advancement of a sleeve 47 in which the nut is mounted as the nut 46 rotates with respect to the threaded end 48 of sleeve 41. This axial movement then is transmitted between sleeve 47 and bearing 44 through a thrust collar 49 which is constructed so that the bearing 44 may also be retracted by reverse movement. A further description of the construction and operation of this means will be found in my co-pending application.

In the embodiment shown in FIGURES 5 through 9, an alternate form of elongated pipe engaging member 29a has one end connected to finger 21a through pin 31a and is provided with spacing washers 32a carried within a recess 51. Similarly, the distal ends of fingers 22a are provided with a pin 33a engaged in a slot 34a at the other end of the pipe engaging member for attaching the fingers thereto while allowing the finger ends to slide along the channel, a washer 36a serving to space the fingers and hold them in place.

Thus, in this embodiment, there may be a U-shaped channel section similar to that shown in the embodiment of FIGURE 1 with an extra thick body portion providing added distance and the advantages mentioned above. Alternatively, the U-shaped sections may be made so that the recess 51 is present at both ends only, the medial portion having the cross-sectional shape shown in FIGURE 8. This allows the channel bar to provide a considerable extension without being extra heavy. As best seen in FIGURES 7, 8 and 9, the abutting surface 52 of the pipe engaging member 29 is preferably curved so as to be at least partially complementary to the curvature of the pipes through the size ranges that the pipe tool holding mechanism is designed to accommodate.

While I have shown two forms of elongated pipe engaging members, it is obvious that other forms could be provided and that these members are interchangeable. In other words, the same tool can be equipped with either form at different times depending upon the use intended for the tool.

In the embodiment shown in FIGURES 5 through 9, it is important that the pipe tool holding mechanism or sleeve 41 does not move axially when the pipe is tightened into position because accurate placement of the cutter head 43 is generally desired. In order to obtain this action, the slot 34a is placed on the same end of the pipe tool holding mechanism as the moving bearing 44 so that the ends of the fingers pivoted at 24a and 31a on both the arbor and the pipe engaging members remain axially fixed at all times. Since the pipe engaging member does not move axially with respect thereto, but only radially, this placement of the slot positively maintains accurate positioning of the holding shaft.

In the embodiment of FIGURES 1 through 4, the slot was placed on the other end in order to illustrate that the tool will operate with either position, but it should be understood that the preferred placement of the slot is that shown in FIGURE 5 and that this placement may be provided in the tool of FIGURE 1, if desired.

From the foregoing description, it is seen that the improvement of this invention solves certain problems which existed in the prior art form of holding mechanism. For example, the smooth skidding surface 52 allows the mechanism to be placed easily inside the pipe even when heavy mechanisms are used and also allows the mechanism to be slid a considerable distance inside the pipe if desired. It is also seen that any tendency for the arbor shaft to become slightly canted and cause some fingers to dig more deeply into the wall of the pipe than others is positively eliminated by this structure because the finger ends preferably bear against the channel bars. In the prior structures such as that illustrated in the Montgomery patent, all fingers will remain tight against the pipe wall but some will be more deeply embedded than others. As a rule, this is not serious, but in some cases the resulting cant of the arbor shaft causes both cutting and machining to become sufficiently out of parallel with the axis to be a serious problem. Accordingly, the improved structure of this invention solves the problem of keeping the arbor shaft in parallel alignment with the wall of the pipe.

It is also seen that the improved structure of this invention provides a better distribution of pressure and makes the tool safe for use in thin walled pipe. Sharp arbor fingers have been known to punch through pipe with thin walls, but with the present structure, a very tight grip can be obtained without danger of this problem. In addition, certain pipes are treated on the internal surface such as in the case of epoxy lined asbestos-cement pipe, and the present structure allows the use of internal pipe holding mechanisms even for these treated pipes without danger to the epoxy lining or the like.

Accordingly, it is seen that there has been provided an improved arbor construction for holding pipe tools which is simple in construction, reliable in operation, and which provides improved performance and versatility for internal holding mechanisms of the character described.

I claim:

1. In an arbor construction for pipe tools containing a central shaft and groups of radially expandable fingers for holding said shaft in central alignment within a pipe, in combination, a pipe engaging member on each group of expandable fingers pivotally attached to two fingers at the ends therof, one of said pivotal attachments being fixed and the other held for axial movement in a slot on the member.

2. The arbor construction defined in claim 1, in which the pipe engaging member is in the shape of an elongated U-shaped channel member.

3. The arbor construction defined in claim 1, in which the pipe engaging member contains a thick body section to add weight and reach to the expandable fingers.

4. A pipe tool mounting mechanism comprising a shaft for carrying a pipe tool rotatably around the central axis of the pipe, a pair of bearing members on said shaft, a plurality of groups of expandable fingers, and an elongated pipe engaging member on each of said groups of expandable fingers, said groups of expandable fingers each comprising a first finger pivoted at one end to one of said bearing members and having its other end pressing against one of the pipe engaging members and a second finger pivoted at one end to the other of said bearing members and having its other end pressing against the same pipe engaging member as the first finger with the first and second fingers being pivoted to each other.

5. A pipe tool mounting mechanism comprising a shaft for carrying a pipe tool rotatably around the central axis of the pipe, a pair of bearing members carried for relative axial movement on the shaft, means for moving said bearing members axially together, a plurality of groups of expandable fingers, and an elongated pipe engaging member on each of said groups of expandable fingers, said groups of expandable fingers each comprising a first finger pivoted at one end to one of said bearing members and having its other end pressing against one of the pipe engaging members and a second finger pivoted at one end to the other of said bearing members and having its other end pressing against the same pipe engaging member as the first finger with the first and second fingers being pivoted to each other.

6. A pipe tool mounting mechanism comprising a shaft for carrying a pipe tool rotatably around the central axis of the pipe, a pair of bearing members carried for relative axial movement on the shaft, means for moving said bearing members axially together, a plurality of groups of expandable fingers, an elongated pipe engaging member on each of said groups of expandable fingers, said groups of expandable fingers each comprising a first finger pivoted at one end to one of said bearing members and having its other end pressing against one of the pipe engaging members and a second finger pivoted at one end to the other of said bearing members and having its other end pressing against the same pipe engaging member as the first finger with the first and second fingers being pivoted to each other, first attaching means for holding one end of said pipe engaging member pivotally to the outer ends of said first finger at a fixed position on said pipe engaging member, a transversely extending slot on the pipe engaging member at the other end thereof, and a second attaching means for holding said pipe engaging member pivotally to the outer ends of said second finger, said second attaching means being slidably held in the slot.

7. The pipe tool mounting mechanism defined in claim 6, in which the pipe engaging member is in the shape of an elongated U-shaped channel member.

8. The pipe tool mounting mechanism defined in claim 6, in which the pipe engaging member contains a thick body section to add weight and reach to the expandable fingers.

9. The pipe tool mounting mechanism defined in claim 6, in which means are provided for holding one of said bearings in a substantially fixed position during expansion of the fingers and this bearing is positioned at the same end of the mechanism as the first attaching means.

10. The pipe tool mounting mechanism defined in claim 6, in which the elongated pipe engaging members have convex outer surfaces.

References Cited by the Examiner
UNITED STATES PATENTS

| | | |
|---|---|---|
| 1,823,959 | 9/1931 | Steinmayer. |
| 1,993,561 | 3/1935 | Meglitz. |
| 2,537,916 | 1/1951 | Rosenboom. |
| 2,607,376 | 8/1952 | Montgomery. |

WILLIAM W. DYER, JR., *Primary Examiner.*